(12) United States Patent
Hu

(10) Patent No.: US 12,370,438 B2
(45) Date of Patent: Jul. 29, 2025

(54) GAMEPAD LEVER AND GAMEPAD

(71) Applicant: Shenzhen Qixiong Technology Co., Ltd, Shenzhen (CN)

(72) Inventor: Xiaochen Hu, Shenzhen (CN)

(73) Assignee: Shenzhen Qixiong Technology Co., Ltd, Shenzhen (CN)

( * ) Notice: Subject to any disclaimer, the term of this patent is extended or adjusted under 35 U.S.C. 154(b) by 330 days.

(21) Appl. No.: 18/109,286

(22) Filed: Feb. 14, 2023

(65) Prior Publication Data

US 2023/0191244 A1    Jun. 22, 2023

(30) Foreign Application Priority Data

Aug. 2, 2022    (CN) .......................... 202222027665.4

(51) Int. Cl.
  *A63F 13/24*    (2014.01)
  *A63F 13/211*    (2014.01)

(52) U.S. Cl.
  CPC ............ *A63F 13/24* (2014.09); *A63F 13/211* (2014.09)

(58) Field of Classification Search
  CPC ................................ A63F 13/24; A63F 13/211
  See application file for complete search history.

(56) References Cited

U.S. PATENT DOCUMENTS

| | | |
|---|---|---|
| 2005/0009606 A1 | 1/2005 | Murzanski et al. |
| 2012/0280087 A1 | 11/2012 | Coffman et al. |
| 2015/0238855 A1* | 8/2015 | Uy .......................... A63F 13/24 463/37 |
| 2016/0361634 A1* | 12/2016 | Gassoway ............. G06F 3/0338 |
| 2017/0001106 A1* | 1/2017 | Gassoway ............. G05G 9/047 |
| 2019/0325116 A1 | 10/2019 | Lin et al. |

* cited by examiner

*Primary Examiner* — David L Lewis
*Assistant Examiner* — Shauna-Kay Hall
(74) *Attorney, Agent, or Firm* — Westbridge IP LLC

(57) ABSTRACT

The present disclosure provides a gamepad lever and a gamepad. The gamepad lever includes a lever body, a mounting member connected with a gamepad main body, a limiting component, and an assembling component, wherein a first connection thread is formed in the lever body; a second connection thread is formed in the mounting member; the first connection thread and the second connection thread are matched with each other; the lever body rotates on the mounting member to adjust a height of the lever body extending out of the mounting member; the first connection thread on the lever body and the second connection thread on the mounting member are matched with each other, so that the lever body can rotate relative to the mounting member.

8 Claims, 10 Drawing Sheets

GAMEPAD LEVER AND GAMEPAD

TECHNICAL FIELD

The present disclosure relates to the technical field of gamepads, in particular to a gamepad lever and a gamepad.

BACKGROUND

A gamepad is a device used for controlling video games.

With the increase of users' entertainment activities, gamepads are more and more common in the life.

At the same time, when a gamepad is compatible with levers with different heights, the gamepads in the prior art all adopt a direct plugging manner to replace lever accessories to adjust the heights of the levers, so that one lever has to be provided with multiple lever accessories with different heights, that is, multiple lever accessories can satisfy the use of one lever. This will cause high production cost. It is complex for use. It is hard to collect multiple sets of accessories which are easy to lose.

Therefore, it is urgent to redesign a new gamepad lever and a gamepad to solve the above problems.

SUMMARY

The present disclosure provides a gamepad lever and a gamepad, so as to solve the technical problems in the above background section.

The present disclosure provides a gamepad lever. The gamepad lever includes a lever body; a mounting member connected with a gamepad main body, wherein a first connection thread is formed in the lever body; a second connection thread is formed in the mounting member; the first connection thread and the second connection thread are matched with each other; the lever body rotates on the mounting member to adjust a height of the lever body extending out of the mounting member; a limiting component, wherein the limiting component is mounted between the lever body and the mounting member to limit the lever body and the mounting member; and an assembling component used for improving the assembling convenience of the limiting component, wherein the assembling component is arranged at an end portion of the lever body.

Optionally, the lever body includes a hand-cranking portion and a loop bar connected with the hand-cranking portion; one end of the loop bar is connected with the hand-cranking portion; and the other end of the loop bar is connected with the mounting member.

Optionally, the mounting member is provided with an assembling rod in threaded connection with the loop bar, and a storage cavity for storing the loop bar is formed between the assembling rod and the mounting member.

Optionally, a diameter of the loop bar is less than a diameter of the hand-cranking portion.

Optionally, an outer side of the loop bar is circumferentially wrapped with a protective layer.

Optionally, a potentiometer accommodating cavity is formed in the assembling rod; a potentiometer component is stored in the potentiometer accommodating cavity; the potentiometer component includes a lever potentiometer, a potentiometer rod and a circuit board; one end of the potentiometer rod extends straightly into the potentiometer accommodating cavity; the other end of the potentiometer rod is connected with the lever potentiometer; and one side of the lever potentiometer away from the potentiometer rod is electrically connected with the circuit board.

Optionally, the limiting component is arranged between the lever body and the mounting member.

The limiting component includes a limiting screw and a stud used for accommodating the limiting screw; the stud is mounted in the mounting member; one end of the limiting screw is in threaded connection in the stud; and the other end of the limiting screw extends into the lever body.

Optionally, a mounting cavity that accommodates the limiting screw is formed in the lever body; a clamping bulge for clamping the limiting screw is arranged in the mounting cavity; one end of the limiting screw extends into the stud; and the other end of the limiting screw abuts against an upper edge of the clamping bulge.

Optionally, one side of the lever body away from the mounting member is inwards sunken to form a recess; and a top cover is assembled in the recess to seal the recess.

Optionally, the present disclosure further provides a gamepad, including the gamepad lever and a gamepad main body, wherein the gamepad lever is connected with the gamepad main body.

The present disclosure has the beneficial effects below:

The gamepad lever includes a lever body, and a mounting member connected with a gamepad main body, wherein a first connection thread is formed in the lever body; a second connection thread is formed in the mounting member; the first connection thread and the second connection thread are matched with each other; the lever body rotates on the mounting member to adjust a height of the lever body extending out of the mounting member; the first connection thread on the lever body and the second connection thread on the mounting member are matched with each other, so that the lever body can rotate relative to the mounting member. Thus, when the lever body rotates, a distance between the lever body and the mounting member can be freely controlled to satisfy the demand experience of a user for heights of different lever bodies, which avoids the problem that a single lever body needs to be provided with a plurality of accessories, reduces the threshold of use of the user, and also reduces the production cost.

BRIEF DESCRIPTION OF THE DRAWINGS

In order to describe the technical solutions in the embodiments of the present disclosure more clearly, accompanying drawings required to be used in the descriptions of the embodiments will be briefly introduced below. Obviously, the drawings in the illustration below are merely some embodiments of the present disclosure. Those ordinarily skilled in the art also can acquire other drawings according to the provided drawings without doing creative work.

DETAILED DESCRIPTION OF THE EMBODIMENTS

The technical solutions in the embodiments of the present disclosure will be described clearly and thoroughly below in combination with the accompanying drawings in the embodiments of the present disclosure. It should be understood that the specific embodiments described here are merely to explain the utility model and not intended to limit the utility model. In addition, it should further be noted that for the purpose of facilitating the description, part not all of structures related to the utility model are illustrated only in the accompanying drawings. Based on the embodiments in the present disclosure, all other embodiments obtained by those of ordinary skill in the art without creative work shall fall within the protection scope of the present disclosure.

The "embodiment" mentioned herein means that specific features, structures or characteristics described in combination with the embodiments may be included in at least one embodiment of the present disclosure. This phrase appearing at each position in the description does not refer to the same embodiment, and is not an independent or candidate embodiment mutually exclusive with other embodiments. Those skilled in the art can explicitly and implicitly understand that the embodiments described herein may be combined with other embodiments.

Figure 1:
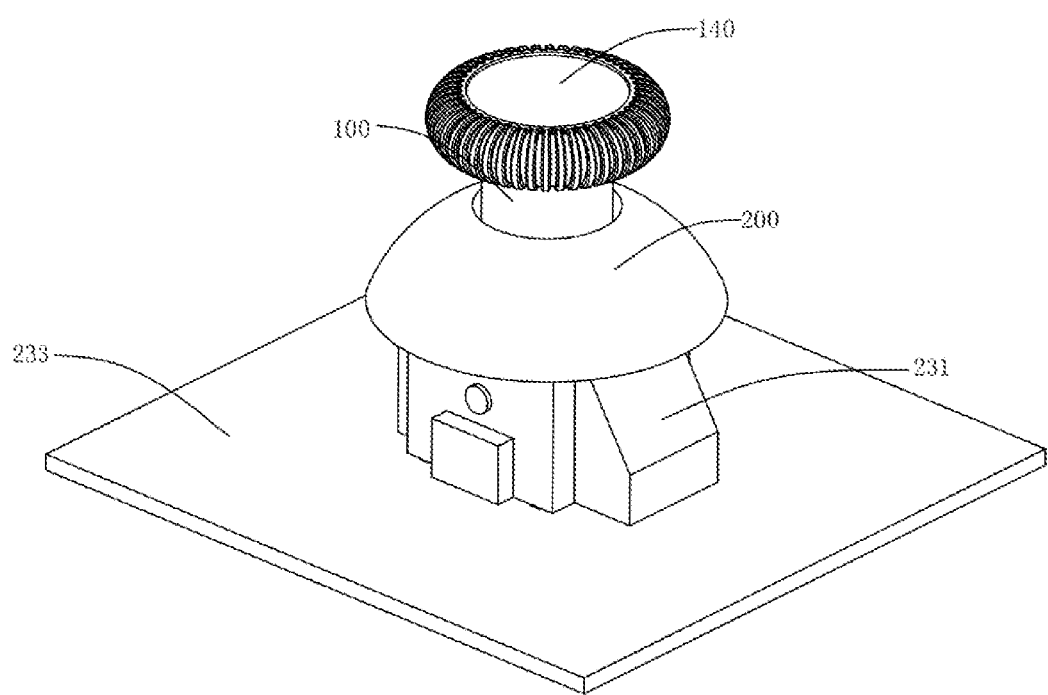
FIG. 1 is a schematic structural diagram of a first view of a gamepad lever provided by the present disclosure.
Figure 2:
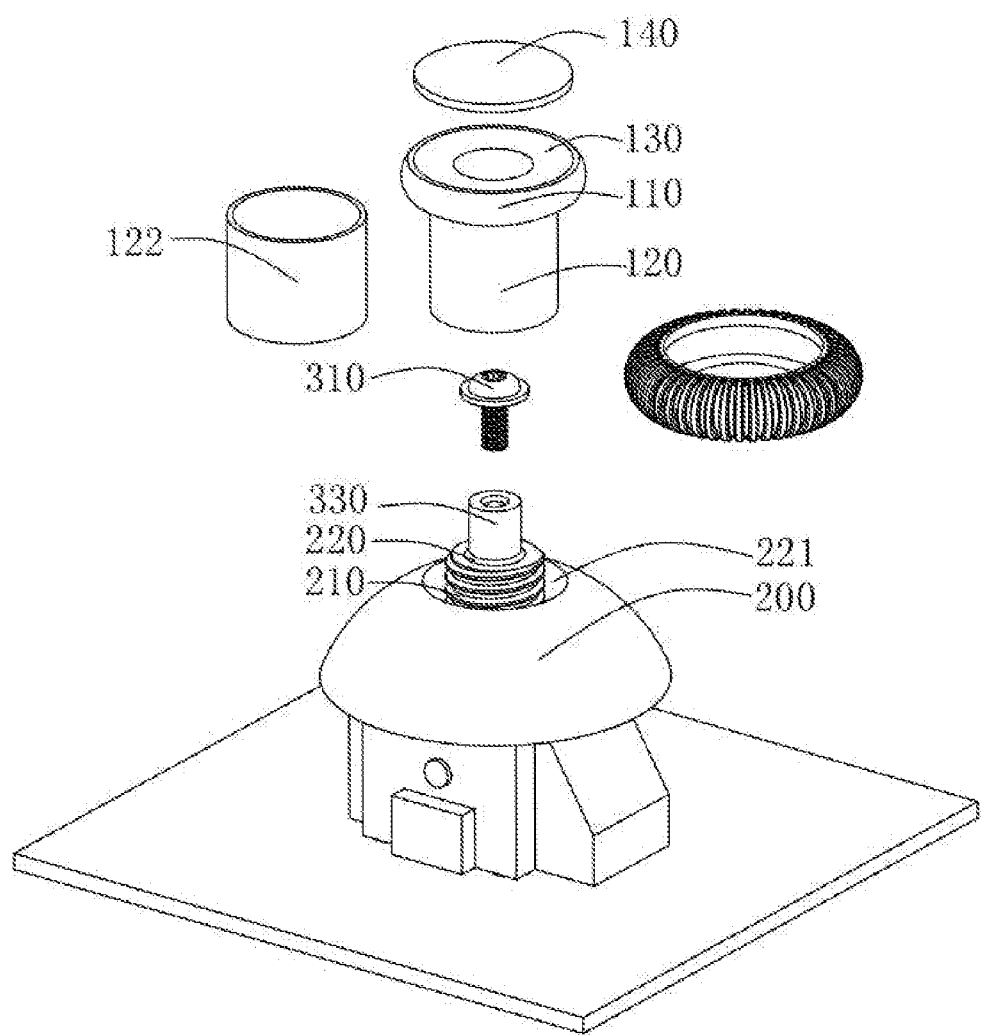
FIG. 2 is an exploded view of a gamepad lever provided by the present disclosure.
Figure 3:
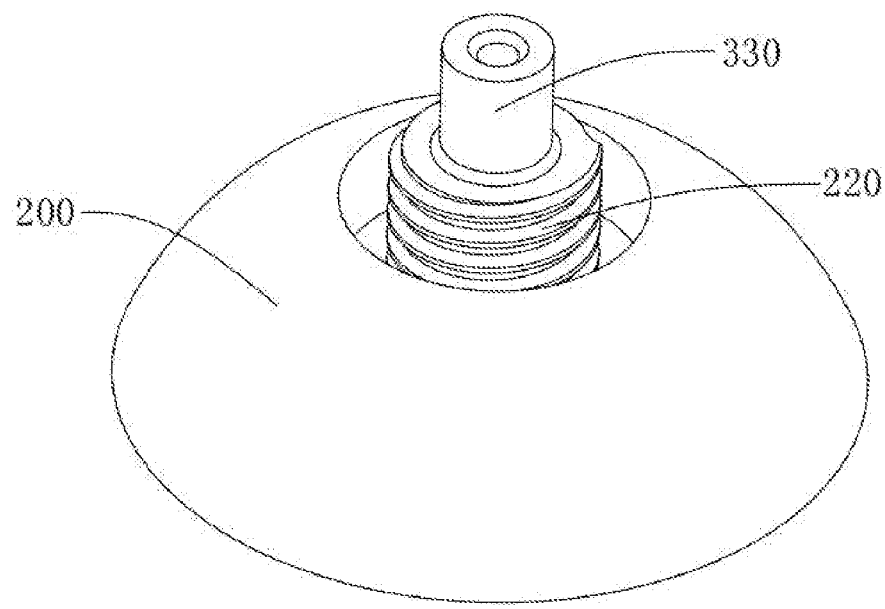
FIG. 3 is a schematic structural diagram of a first view of a mounting member of a gamepad lever provided by the present disclosure.
Figure 4:
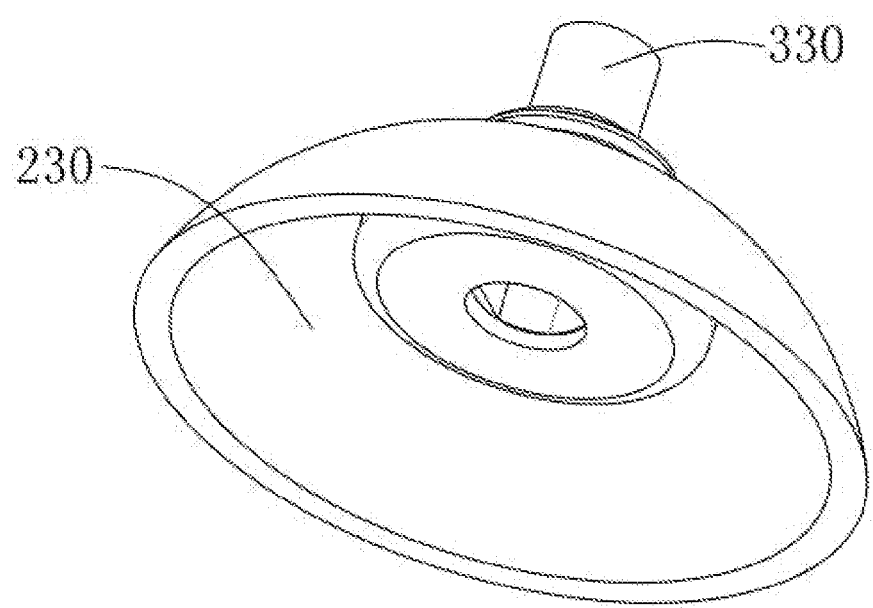
FIG. 4 is a schematic structural diagram of a second view of a mounting member of a gamepad lever provided by the present disclosure.
Figure 5:
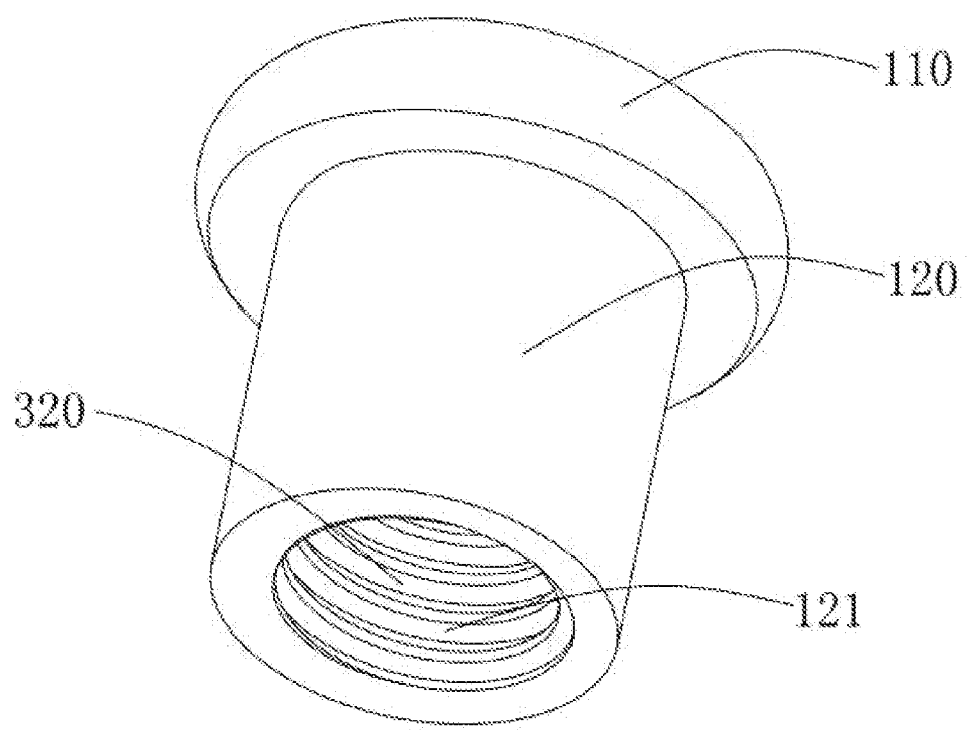
FIG. 5 is a schematic structural diagram of a first view of a lever body of a gamepad lever provided by the present disclosure.
Figure 6:
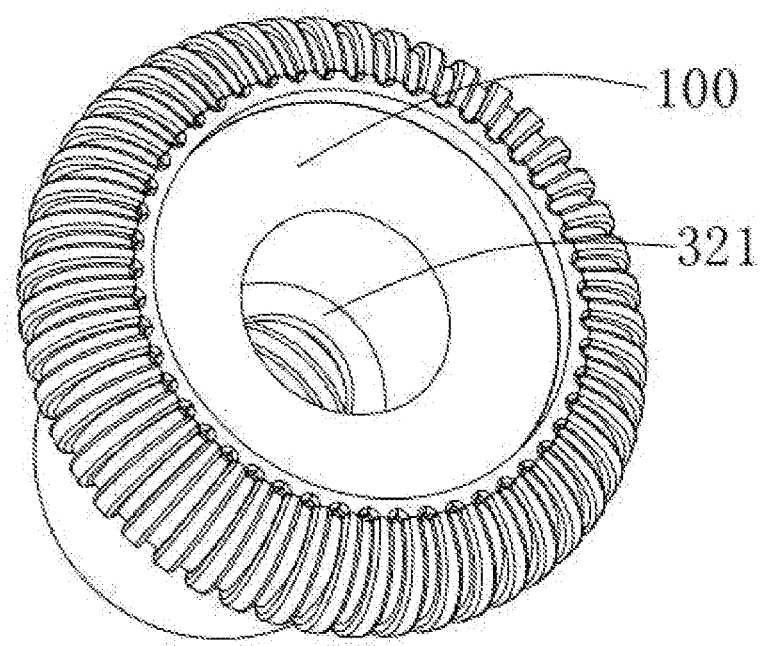
FIG. 6 is a schematic structural diagram of a second view of a lever body of a gamepad lever provided by the present disclosure.
Figure 7:
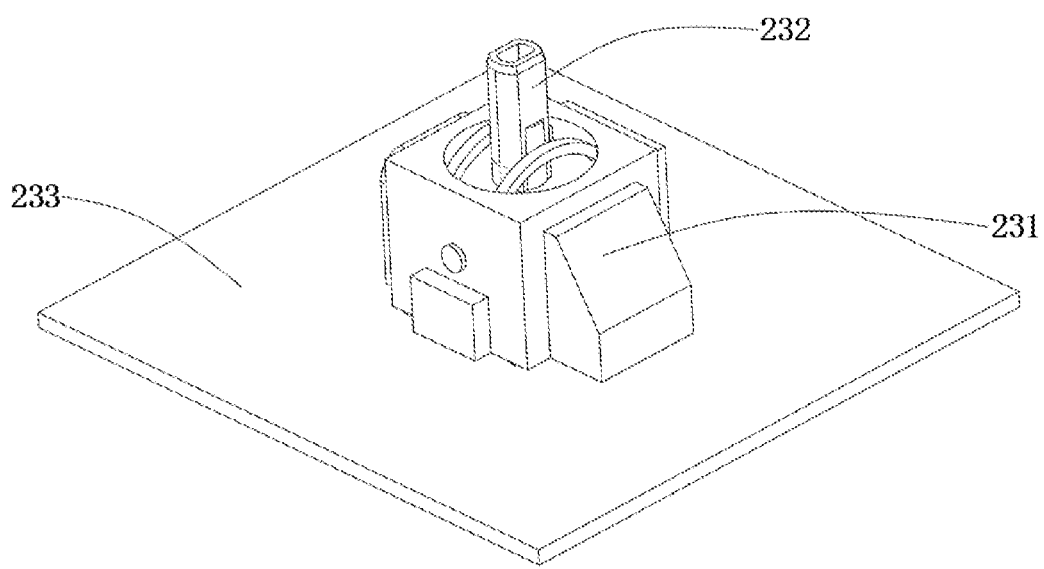
FIG. 7 is a schematic structural diagram of a potentiometer component of a gamepad lever provided by the present disclosure.
Figure 8:
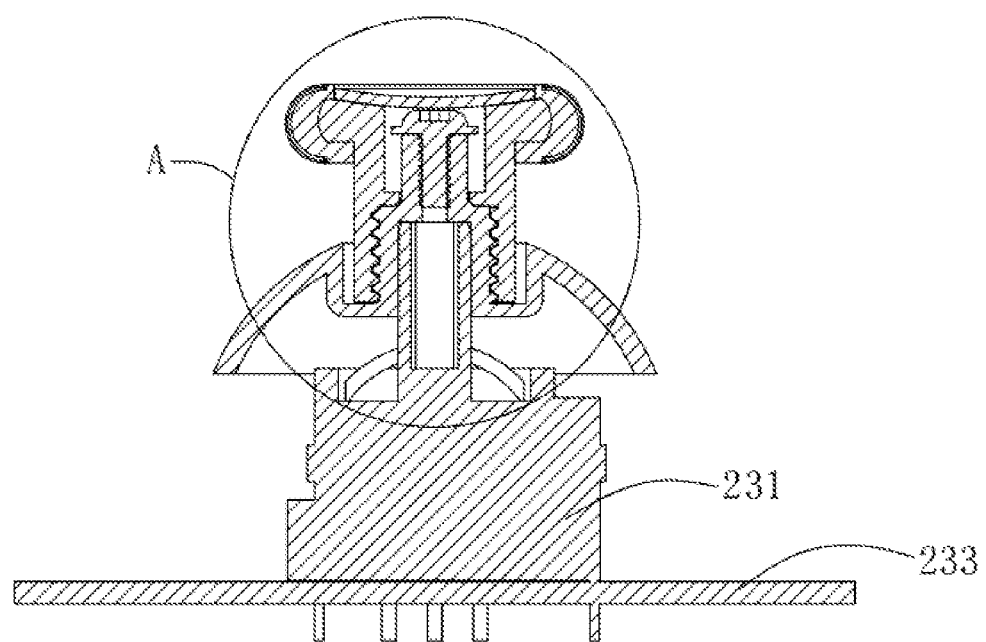
FIG. 8 is a schematic structural diagram of a sectional view of a gamepad lever provided by the present disclosure.
Figure 9:
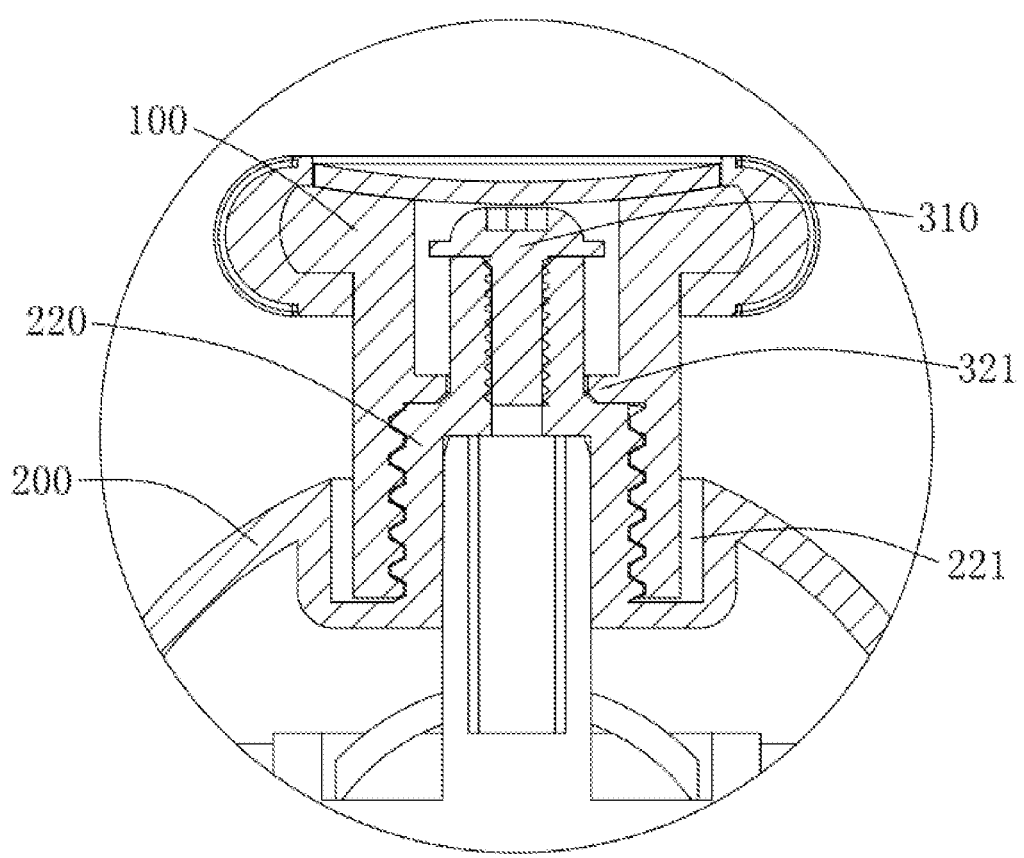
FIG. 9 is a partially enlarged diagram of region A in FIG. 8.
Figure 10:
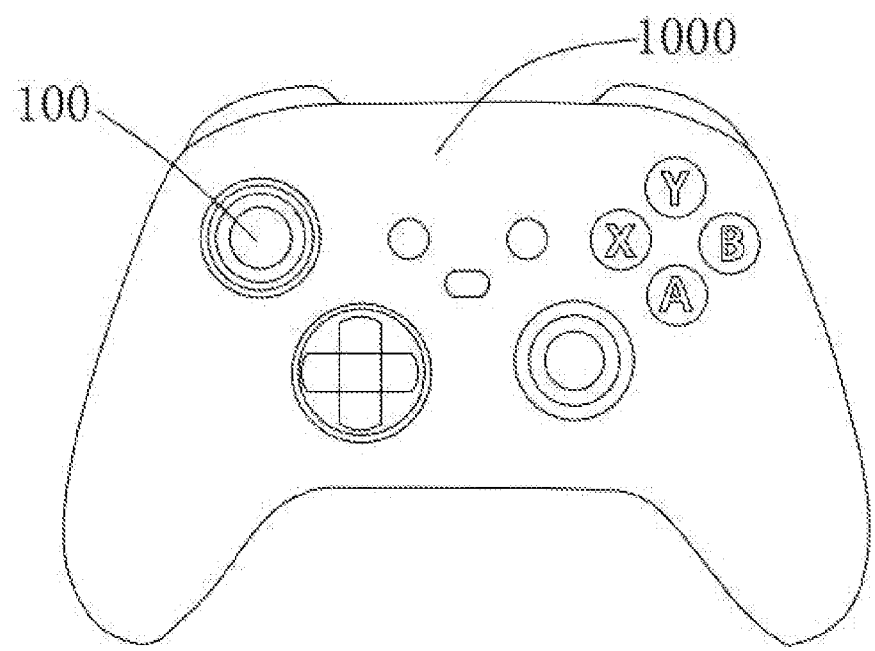
FIG. 10 is a schematic structural diagram of a gamepad main body provided by the present disclosure.

Referring to FIG. 1 to FIG. 10, a gamepad lever of the present disclosure includes a lever body 100, and a mounting member 200 connected with the gamepad main body 1000.

A first connection thread 121 is formed in the lever body 100. A second connection thread 210 is formed in the mounting member 200. The first connection thread 121 and the second connection thread 210 are matched with each other. The lever body 100 rotates on the mounting member 200 to adjust a height of the lever body 100 extending out of the mounting member 200. The gamepad lever further includes a limiting component. The limiting component is mounted between the lever body 100 and the mounting member 200 to limit the lever body 100 and the mounting member 200.

In one embodiment, the first connection thread 121 is an internal thread, and the second connection thread 210 is an external thread, so that the mounting member 200 spirally enters the lever body 100 to control the height of the lever body 100.

In another embodiment, the first connection thread 121 is an external thread, and the second connection thread 210 is an internal thread, so that the lever body 100 spirally enters the lever body 200 to control the height of the lever body 100.

Meanwhile, the limiting component limits the lever body 100 and the mounting member 200, so that the lever body 100 will not be completely separated from the mounting member 200.

Further, by the arrangement of an assembling component, it can be convenient for freely mounting and removing the limiting component in the lever body 100.

In this embodiment, the lever body 100 includes a hand-cranking portion 110 and a loop bar 120 connected with the hand-cranking portion 110. One end of the loop bar 120 is connected with the hand-cranking portion 110. The other end of the loop bar 120 is connected with the mounting member 200.

In one embodiment, the hand-cranking portion 110 and the loop bar 120 are detachably connected to facilitate their assembling. In another embodiment, the hand-cranking portion 110 and the loop bar 120 are integrally molded to improve the stability of rotation of the hand-cranking portion 110.

Specifically, the first connection thread 121 is arranged inside the loop bar 120, and the second connection thread 210 is formed in the mounting member 200, thus connecting the first connection thread 121 with the second connection thread 210 to adjust a height of the loop bar 120 with respect to the mounting member 200.

Furthermore, a diameter of the loop bar 120 is less than that of the hand-cranking portion 110, that is, the diameter of the hand-cranking portion 110 is larger, so as to improve the fitness to the hand of a user and improve the comfort of the user using the hand-cranking portion 110. Meanwhile, a rubber sleeve is arranged on an outer side of the hand-cranking portion 110 to further improve the comfort of the user using the hand-cranking portion 110. The hand-cranking portion 110 and the rubber sleeve can be in injection molding or overmolding.

In this embodiment, the mounting member 200 is provided with an assembling rod 220 in threaded connection with the loop bar 120, and a storage cavity 221 for storing the loop bar 120 is formed between the assembling rod 220 and the mounting member 200.

The loop bar 120 and the assembling rod 220 are in threaded connection, so that when the user controls the hand-cranking portion 110 to rotate, the hand-cranking portion 110 drives the loop bar 120 to rotate relative to the assembling rod 220. Thus, the loop bar 120 vertically moves on the assembling rod 220, and the user can control, by means of rotating the hand-cranking portion 110, the height of the hand-cranking portion 110 when the hand-cranking portion is mounted on the assembling rod 220.

Furthermore, a storage cavity 221 is formed in the mounting member 200. The shape of the storage cavity 221 is matched with the loop bar 120, and a width in the storage cavity 221 is greater than a thickness of the loop bar 120 to improve the storage adaptability of the loop bar 120. Specifically, when the user controls the hand-cranking portion 110 to rotate, the hand-cranking portion 110 drives the loop bar 120 to rotate on the assembling rod 220. In addition, as the loop bar 120 rotates on the assembling rod 220, since the loop bar 120 and the assembling rod 220 are in threaded connection, the loop bar 120 will vertically move relative to the assembling rod 220. When the user rotates the hand-cranking portion 110, the hand-cranking portion 110 will vertically move with the loop bar 120.

Further, when the loop bar 120 drives the hand-cranking portion 110 to move down, an outer edge of the loop bar 120 extends into the storage cavity 221, thus improving the stability of use of the hand-cranking portion 110 by the user.

Meanwhile, an outer side of the loop bar 120 is circumferentially wrapped with a protective layer 122. By the arrangement of the protective layer 122, when the user uses the hand-cranking portion 110, friction between the hand-cranking portion 110 and a gamepad is reduced, thus improving the smoothness of use of the hand-cranking portion 110 by the user. Furthermore, a material of the protective layer 122 can be steel.

In this embodiment, a potentiometer accommodating cavity 230 is formed in the assembling rod 220. A potentiometer component is stored in the potentiometer accommodating cavity 230. The potentiometer component includes a lever potentiometer 231, a potentiometer rod 232 and a circuit board 233. One end of the potentiometer rod 232 extends straightly into the potentiometer accommodating cavity 230. The other end of the potentiometer rod 232 is connected with the lever potentiometer 231. One side of the lever potentiometer 231 away from the potentiometer rod 232 is electrically connected with the circuit board 233.

The potentiometer component is used for identifying a moving trajectory of the lever body 100, so as to transmit an electrical signal of the moving trajectory of the lever body 100 to the gamepad connected outside.

Specifically, the potentiometer rod 232 is accommodated in the potentiometer accommodating cavity 230. A lower end of the potentiometer rod 232 is connected with the lever potentiometer 231. The potentiometer rod 232 moves together with the lever body 100, thus transmitting the moving trajectory to the lever potentiometer 231. The lever potentiometer 231 converts the moving trajectory into a potential signal and transmits same to the circuit board 233.

In this embodiment, the limiting component is arranged between the lever body 100 and the mounting member 200.

The limiting component includes a limiting screw 310 and a stud 330 used for accommodating the limiting screw 310. The stud 330 is mounted in the mounting member 200. One end of the limiting screw 310 is in threaded connection in the stud 330, and the other end of the limiting screw 310 extends into the lever body 100.

The limiting component can limit a rotating height of the lever body 100 relative to the mounting member 200, thus ensuring that the height of the lever body 100 is adjusted within a reasonable range.

Specifically, the stud 330 is mounted at an upper end of the assembling rod 220. A lower end of the limiting screw 310 extends into the stud 330. An upper end of the limiting screw 310 extends into the lever body 100. Thus, the limiting screw 310 can limit the lever body 100 to move within a certain range.

In this embodiment, a mounting cavity 320 that accommodates the limiting screw 310 is formed in the lever body 100. A clamping bulge 321 for clamping the limiting screw 310 is arranged in the mounting cavity 320. One end of the limiting screw 310 extends into the stud 330, and the other end of the limiting screw 310 abuts against an upper edge of the clamping bulge 321.

The end of the limiting screw 310 extending into the lever body 100 is just located on one side of the clamping bulge 321 away from the mounting member 200, so that the clamping bulge 321 limits one end of the limiting screw 310, which ensures that the limiting screw 310 will not be separated from the mounting cavity 320 or the stud 330.

In this embodiment one side of the lever body 100 away from the mounting member 200 is inwards sunken to form a recess 130, and a top cover 140 is assembled in the recess 130 to seal the recess 130.

The recess 130 can communicate with the mounting cavity 320, so that the user mounts the limiting screw 310 in the mounting cavity 320 through the recess 130, and it is convenient to mount and remove the limiting screw 310.

The present disclosure further provides a gamepad, including a gamepad lever and a gamepad main body 1000. The gamepad lever is connected with the gamepad main body 1000.

The gamepad lever includes a lever body 100, a mounting member 200 connected with a gamepad main body 1000. A first connection thread 121 is formed in the lever body 100. A second connection thread 210 is formed in the mounting member 200. The first connection thread 121 and the second connection thread 210 are matched with each other. The lever body 100 rotates on the mounting member 200 to adjust a height of the lever body 100 extending out of the mounting member 200. The gamepad lever further includes a limiting component. The limiting component is mounted between the lever body 100 and the mounting member 200 to limit the lever body 100 and the mounting member 200. The gamepad lever further incudes an assembling component for improving the assembling convenience of the limiting component. The assembling component is arranged at an end portion of the lever body 100. The first connection thread 121 on the lever body 100 and the second connection thread 210 on the mounting member 200 are matched with each other, so that the lever body 100 can rotate relative to the mounting member 200. Thus, when the lever body 100 rotates, a distance between the lever body 100 and the mounting member 200 can be freely controlled to satisfy the demand experience of a user for heights of different lever bodies 100, which avoids the problem that a single lever body 100 needs to be provided with a plurality of accessories, reduces the threshold of use of the user, and also reduces the production cost.

The above descriptions are only the implementations of the present disclosure, and are not intended to limit the patent scope of the present disclosure. Any equivalent structure or equivalent process transformation made by using the content of the specification and drawings of the present disclosure and directly or indirectly applied to other related technical fields shall all be similarly included in the scope of patent protection of the present disclosure.

What is claimed is:

1. A gamepad lever, connected with a gamepad main body and comprising a lever body, a mounting member connected with the gamepad main body, a limiting component, and an assembling component used for improving the assembling convenience of the limiting component, wherein
   a first connection thread is formed in the lever body;
   a second connection thread is formed in the mounting member; the first connection thread and the second connection thread are matched with each other; the lever body rotates on the mounting member to adjust a height of the lever body extending out of the mounting member;
   the limiting component is mounted between the lever body and the mounting member to limit the lever body and the mounting member;
   the lever body comprises a hand-cranking portion and a loop bar connected with the hand-cranking portion; one end of the loop bar is connected with the hand-cranking portion; and the other end of the loop bar is connected with the mounting member; and
   a diameter of the loop bar is less than a diameter of the hand-cranking portion.

2. The gamepad lever according to claim 1, wherein the mounting member is provided with an assembling rod in threaded connection with the loop bar, and a storage cavity for storing the loop bar is formed between the assembling rod and the mounting member.

3. The gamepad lever according to claim 2, wherein an outer side of the loop bar is circumferentially wrapped with a protective layer.

4. The gamepad lever according to claim 2, wherein a potentiometer accommodating cavity is formed in the assembling rod; a potentiometer component is stored in the potentiometer accommodating cavity;

the potentiometer component comprises a lever potentiometer, a potentiometer rod and a circuit board; one end of the potentiometer rod extends straightly into the potentiometer accommodating cavity; the other end of the potentiometer rod is connected with the lever potentiometer; and one side of the lever potentiometer away from the potentiometer rod is electrically connected with the circuit board.

5. The gamepad lever according to claim 1, wherein the limiting component comprises a limiting screw and a stud used for accommodating the limiting screw; the stud is mounted in the mounting member; one end of the limiting screw is in threaded connection in the stud; and the other end of the limiting screw extends into the lever body.

6. The gamepad lever according to claim 5, wherein a mounting cavity that accommodates the limiting screw is formed in the lever body; a clamping bulge for clamping the limiting screw is arranged in the mounting cavity; one end of the limiting screw extends into the stud; and the other end of the limiting screw abuts against an upper edge of the clamping bulge.

7. The gamepad lever according to claim 1, wherein one side of the lever body away from the mounting member is inwards sunken to form a recess; and a top cover is assembled in the recess to seal the recess.

8. A gamepad, comprising the gamepad lever according to claim 1, and a gamepad main body, wherein the gamepad lever is connected with the gamepad main body.

* * * * *